(12) United States Patent
Logvin et al.

(10) Patent No.: US 7,020,371 B2
(45) Date of Patent: Mar. 28, 2006

(54) PLANAR WAVEGUIDE STRUCTURE WITH POLARIZATION COMPENSATION

(75) Inventors: Yury Logvin, Ottawa (CA); Serge Grabtchak, Orleans (CA)

(73) Assignee: MetroPhotonics Inc., Ottawa (CA)

( * ) Notice: Subject to any disclaimer, the term of this patent is extended or adjusted under 35 U.S.C. 154(b) by 85 days.

(21) Appl. No.: 10/851,319

(22) Filed: May 24, 2004

(65) Prior Publication Data

US 2004/0234223 A1 Nov. 25, 2004

Related U.S. Application Data

(60) Provisional application No. 60/472,775, filed on May 23, 2003.

(51) Int. Cl.
*G02B 6/10* (2006.01)
(52) U.S. Cl. .......................... 385/129; 385/11; 385/130; 385/131; 385/132; 385/14
(58) Field of Classification Search ................. 385/11, 385/129–132, 14
See application file for complete search history.

(56) References Cited

U.S. PATENT DOCUMENTS 6,408,112 B1 * 6/2002 Bartels ........................ 385/16

OTHER PUBLICATIONS

Popovic et al., "Air Trenches for Sharp Silica Waveguide Bends", Journal of Lightwave Technology, vol. 20, No. 9, Sep. 2002.
Seo, "Low Transition Losses in Bent Rib Waveguides", Journal of Lightwave Technology, vol. 14, No. 14, Oct. 1996.

* cited by examiner

*Primary Examiner*—Brian Healy
*Assistant Examiner*—Jerry Martin Blevins
(74) *Attorney, Agent, or Firm*—Freedman & Associates

(57) ABSTRACT

A design for a polarization independent ridge waveguide structure is shown. The inventive waveguide structure features discontinuous trenches formed on either side of the waveguide in which the waveguide has a first polarization characteristic absent the trenches and a second polarization characteristic when the trenches are present. The length of the trenches and the distance between the trenches are chosen to provide a desired amount of attenuation to each of the TE and TM modes. Additionally, this method is used to cause a predetermined polarization in order to compensate for the polarization of another optical component.

19 Claims, 3 Drawing Sheets

PLANAR WAVEGUIDE STRUCTURE WITH POLARIZATION COMPENSATION

This application claims the benefit of U.S. Provisional Application No. 60/472,775 filed May 23, 2003.

FIELD OF THE INVENTION

This invention relates to integrated waveguide devices used in optical communications that are produced from planar waveguide substrates and more particularly to polarization compensation in weakly confined optical waveguides.

BACKGROUND OF THE INVENTION

Optical components are extensively used in data communication networks. Typically these components are designed to propagate optical signals. In order to preserve signal integrity it is important to maintain certain optical characteristics. One of these characteristics is polarization dependent loss. Polarization dependant loss causes differing optical signals having substantially equal wavelengths to experience different attenuation characteristics in optical components. Since attenuation is critical for a variety of reasons it is necessary to ensure that the intensity of an optical signal is predictable in order to ensure the signal to noise ratio is within an acceptable range.

This is a key concern for optical network designers because different lasers have different polarization characteristics. Additionally, it is known that many different types of integrated optical components suffer very high polarization dependant loss. As more of these components are introduced into an optical network problems arising from polarization dependant loss are complicated.

Clearly, it would be beneficial to have integrated optical components which are polarization insensitive.

SUMMARY OF THE INVENTION

The invention teaches an integrated waveguide structure comprising:

a first waveguide for weakly confining a first optical signal propagating therein, said first waveguide having an optical propagation axis and a characteristic length as measured along said optical propagation axis, said first waveguide disposed on a substrate;

a first trench formed within said substrate on a first side of said first waveguide, said trench having a characteristic length as measured parallel to said optical propagation axis of the first waveguide, said characteristic length of the trench being substantially shorter than said characteristic length of the first waveguide;

a second trench formed on a second side of the first waveguide, said second trench disposed opposite said first trench, said second trench having a characteristic length approximately equal to that of the first trench;

a third trench formed within said substrate on a first side of said first waveguide, said third trench having a characteristic length as measured parallel to said optical propagation axis of the first waveguide, said characteristic length of the third trench being substantially shorter than said characteristic length of the first waveguide; and, a fourth trench formed on a second side of the first waveguide, said fourth trench disposed opposite said third trench, said fourth trench having a characteristic length approximately equal to that of the third trench, said trenches having a low index of refraction material therein, said characteristic length of the first trench, said characteristic length of the third trench, and a distance between the first trench and the second trench being chosen to provide a predetermined polarization characteristic to the waveguide structure.

Further, the invention provides a method of providing a polarization characteristic to an optical signal comprising:

propagating the optical signal along a first section of a waveguide having a first set of trenches disposed sufficiently proximate the waveguide, the trenches for dispersing an optical signal coupled from the waveguide to any of the first set of trenches;

propagating the optical signal along a second section of the waveguide absent trenches; and, propagating the optical signal along a third section of a waveguide having a second set of trenches disposed sufficiently proximate the waveguide, the second set of trenches for dispersing an optical signal coupled from the waveguide to any of the second set of trenches, such that the first section, the second section and the third section each has a predetermined polarization characteristic per unit length and the lengths of the first section, second section and third section are chose to provide a predetermined polarization characteristic to the optical signal.

BRIEF DESCRIPTION OF THE DRAWINGS

The invention is now described with respect to the figures in which.

DETAILED DESCRIPTION OF THE INVENTION

Figure 1:
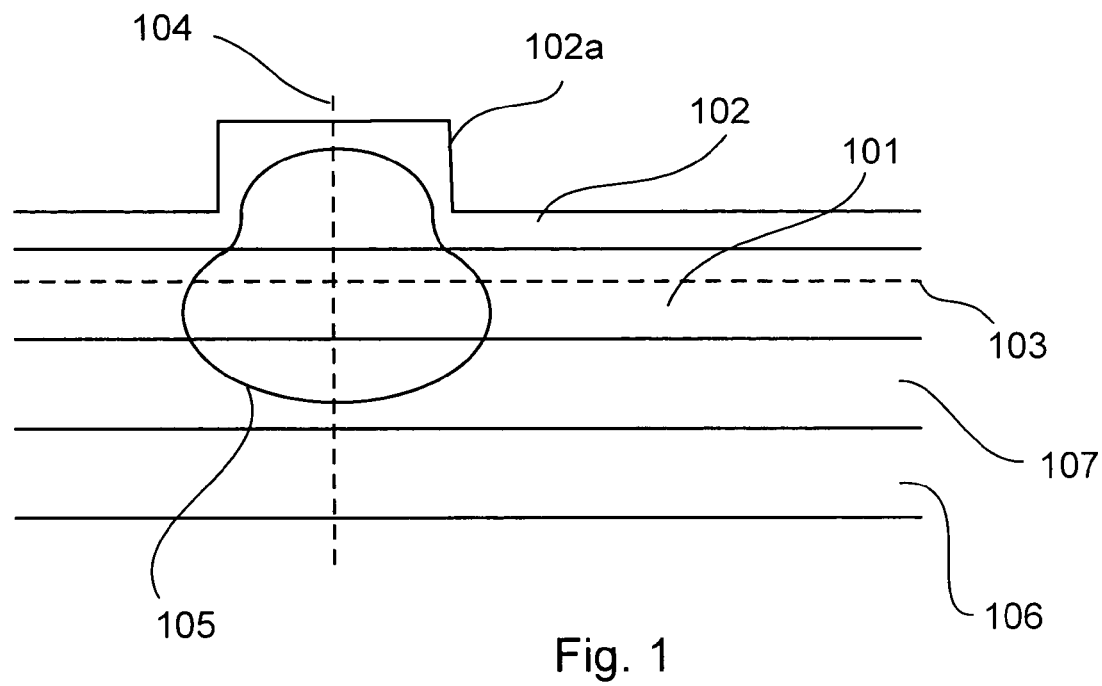
FIG. 1 is a section view of a waveguide structure that is polarization dependant.

Referring to FIG. 1 a cross section view of a prior art waveguide structure formed on a planar substrate 100 is shown. The waveguide structure comprises a waveguide core layer 101, an upper cladding layer 102 with a ridge 102a, a lower cladding layer 107 and a planar substrate 106. A horizontal axis 103 and a vertical axis 104 are also shown. The line 105 corresponds to region of equal optical intensity for light propagating within the waveguide of the waveguide structure. This waveguide structure has been designed to propagate only a lowest order single mode of light. Light having other higher order modes will dissipate within this structure far faster than light propagating along the waveguide and having the desired single mode. The waveguide core layer 101 has a higher index of refraction than the upper cladding layer 102, the lower cladding layer 107, and planar substrate 106. The ridge 102a of the upper cladding layer serves to weakly confine light propagating within the waveguide. Light propagating within the waveguide is subjected polarization due to differences in propagation of light associated with a TE mode and a TM mode. Typically, it is very difficult to design a waveguide substrate in which the two polarization states are equal without incurring other undesired properties, such as very high insertion loss or very high cost.

Figure 2:
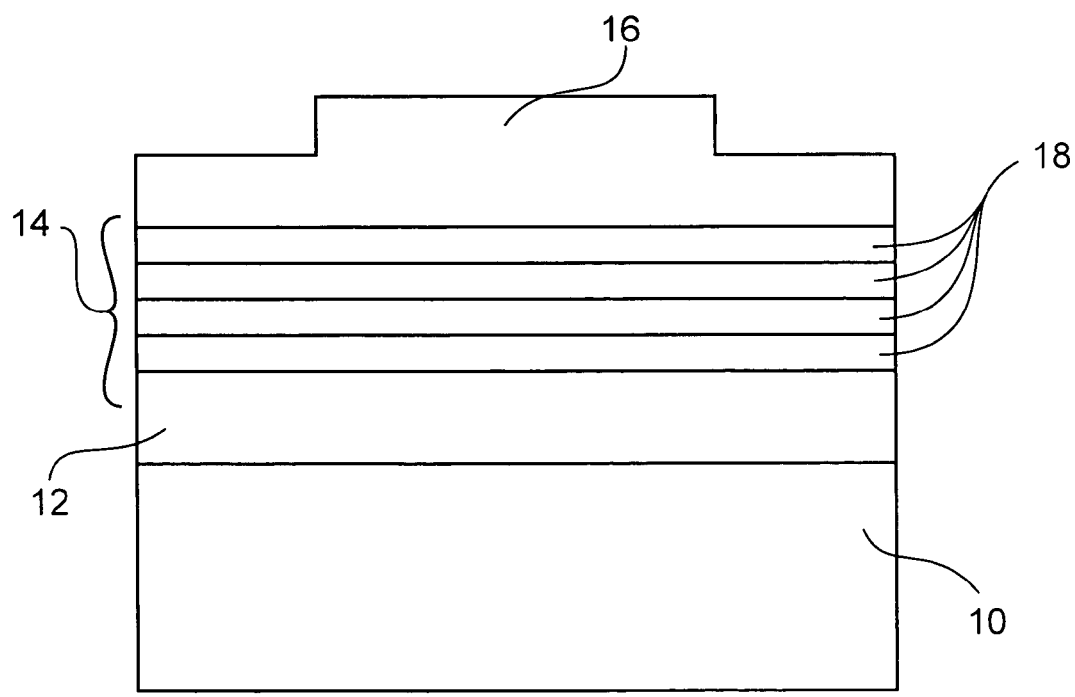
FIG. 2 is a section view of a prior art waveguide structure.

Referring to FIG. 2, a prior art waveguide structure is shown. This waveguide structure includes a complex set of layers that form a polarization compensated ridge waveguide. The waveguide structure comprises a waveguide substrate 10, a lower cladding layer 12, a waveguide core layer 14 having a set of quantum well layers 18, and an upper cladding layer 16. The manufacture of this waveguide involves a large number of steps using very expensive equipment. Additionally, the tolerances necessary to produce the desired optical performance are often difficult to maintain. For example, the quantum well layers incorporated in this structure are not easily produced rapidly and therefore the production of this waveguide device typically necessitates using a very expensive piece of equipment for an extended period of time. Clearly, this cost is reflected in the finished cost of the waveguide substrate.

Figure 3A:
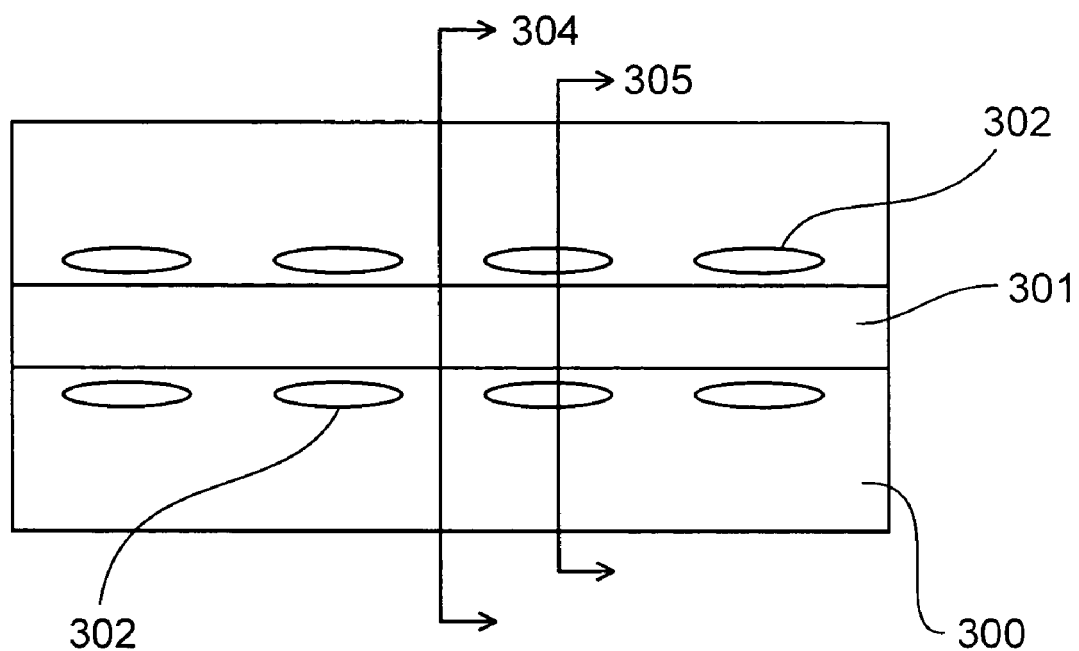
FIG. 3a is a top view of a first embodiment of the invention.

Referring to FIG. 3a, a top view of ridge waveguide structure according to a first embodiment of the invention is shown. This waveguide structure features a waveguide substrate 300, a ridge 301 and a plurality of trenches 302. The figure also shows a first section line 304 and a second section line 305. A person of skill in the art of integrated waveguide design will be aware that this type of structure is useable for a semi-conductor waveguide, such as an Indium Phosphide waveguide or a Galium Arsenide Waveguide. Additionally, such a person will be aware that the trenches 302 are easily produced using a deep etching process.

Figure 3B:
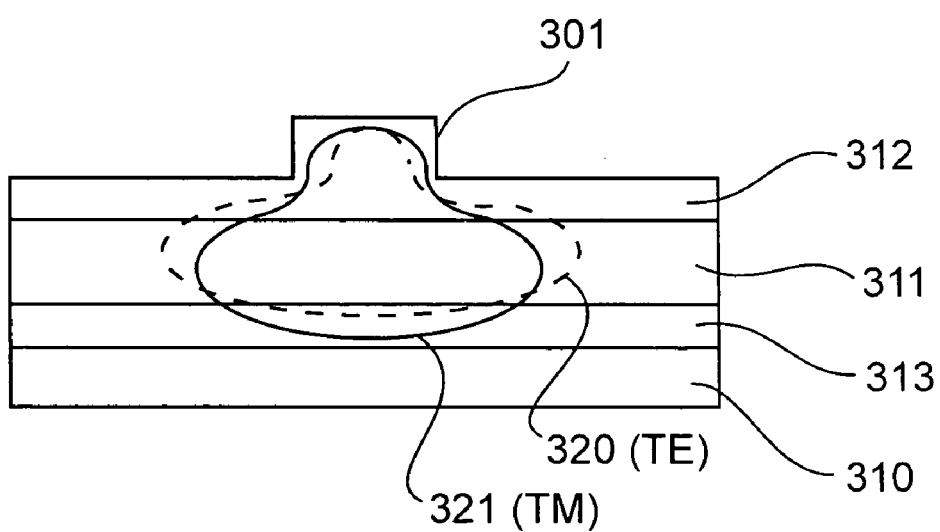
FIG. 3b is a section view of the first embodiment of the invention in which no trenches are present.

Referring to FIG. 3b, a cross section view corresponding to the first section line 304 is shown. The section view includes: a waveguide substrate 310, a core layer 311, a lower cladding layer 313 and an upper cladding layer 312 with ridges 301. The intensity of light corresponding to the TE mode profile 320 and TM mode profile 321 are also shown. This section is highly analogous to the section view of a prior art waveguide provided by FIG. 1. Clearly, if this section corresponded to the entire length of the waveguide then the waveguide would have undesirable polarization consistent with that of the prior art in FIG. 1. It is readily apparent that the TE mode profile 320 and the TM mode profile 321 have slightly different shapes. As is well known to those of skill in the art, as an optical signal propagates within the waveguide structure of FIG. 3a it is partially attenuated and the TE mode will undergo less attenuation than the TM mode in the waveguide structure of FIG. 3b.

Figure 3C:
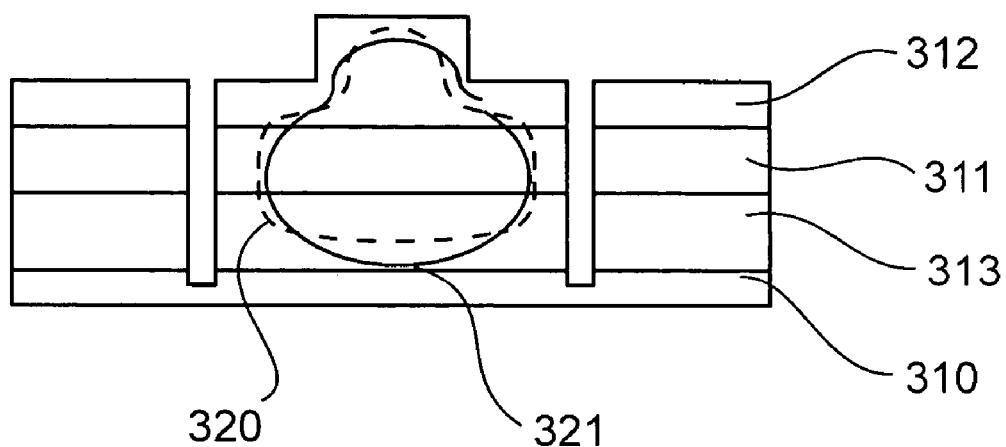
FIG. 3c is a section view of the first embodiment of the invention in which trenches are present; and, FIG. 4 is a second embodiment of the invention.

Referring to FIG. 3c, a cross section view corresponding to the second section line 305 is shown. The cross section view clearly shows the waveguide substrate 310, a core layer 311 and an upper cladding layer 312 with ridges 301. The trenches 302 are also present. Lines 320 and 321 correspond to the TE mode profile and the TM mode profile, respectively. The trenches 302 are disposed to cause a small portion of the TE mode to couple into the trenches 302. A substantially smaller portion of the TM mode also couples into the trenches 302. The result is an optical signal propagating within the waveguide structure shown in FIG. 3b will be partially attenuated and a portion of the optical signal corresponding to the TE mode experiences a higher degree of attenuation than a portion corresponding to the TM mode.

As is well known to those of skill in the art, the attenuation of a waveguide is dependent upon an attenuation characteristic per unit length multiplied by the length through the waveguide that the optical signal propagates. Thus, once the characteristics of the waveguides of FIG. 3b and FIG. 3c have been determined, it is a simple matter to determine the ratio of lengths of the waveguide structures shown in FIG. 3b and FIG. 3c in order to produce a waveguide structure having a desired polarization dependent loss. Thus, a first design of a waveguide structure consistent with FIG. 3a includes an optical path having negligible polarization dependant loss. A second design of a waveguide structure consistent with FIG. 3 includes an optical path having a predetermined polarization dependant loss that has been chosen to compensate for the polarization characteristic of another optical component, for example, a semiconductor optical amplifier (SOA) or an erbium doped waveguide array (EDWA).

Figure 4:
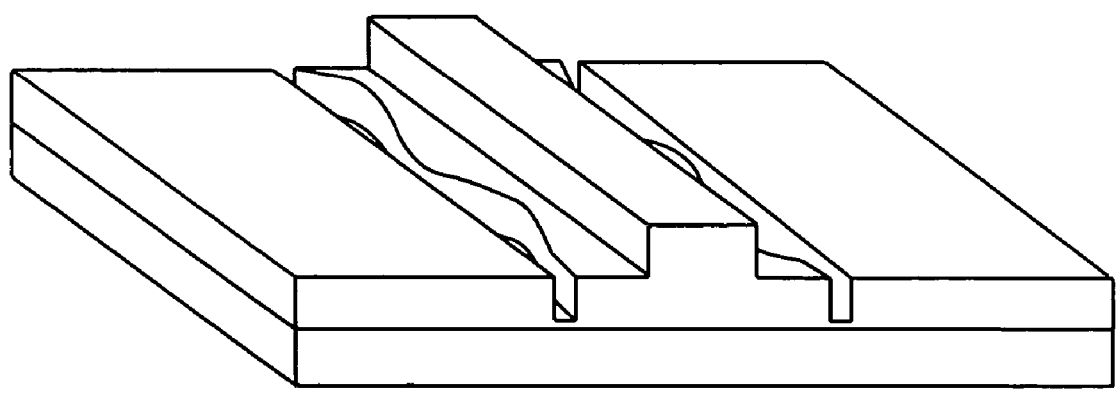

As a person of skill in the art will be aware, the depth of the trench should be sufficiently deep that the attenuation characteristic of the corresponding waveguide is affected. The trench is optionally much deeper. In fact, the invention will support a trench that penetrates the entire depth of the substrate. Thus, for the purposes of this document, a trench should be considered as a feature disposed proximate a waveguide having sufficient depth to attenuate one of the TE and TM modes more than the other. Referring to FIG. 4 a second embodiment of the invention is shown having a feature intended to substantially duplicate some of the effects of the trenches as described with reference to FIGS. 3a, 3b and 3c. The waveguide structure of FIG. 4 features a waveguide core having a periodically varying width. In a region in which the waveguide core is narrow the waveguide is sufficiently narrow that the mode profiles of the lowest order TE and TM modes are affected. In a region where the width of the waveguide core is a maximum the waveguide core is sufficiently wide that the mode profiles of the lowerst order TE and TM mode experience a different attenuation characteristic than in the narrow region. Optionally, in the region where the waveguide core width is maximized, the lower order TE and TM mode are not substantially affected by the presence of the trench.

A person of skill in the art will appreciate that embodiments of the invention are useful for both active and passive waveguide structures. Although a wide variety of optical components will produce polarization dependent loss, it is felt that the invention is particularly useful in compensating for polarization dependent loss in active optical components such as laser sources and optical amplifiers. Since a deep etching process is commonly used step in producing ridge waveguide structures, the costs of providing polarization compensated components is minimal using the teaching of the invention. A person of skill will be aware that indium phosphide (IP) and gallium arsenide (GaAs) are commonly used materials for building laser sources and optical amplifiers with ridge waveguides.

Although various embodiments of the invention are shown featuring a ridge waveguide structure it will be apparent to one of skill in the art that a buried waveguide structure is easily modified to vary the polarization of a single mode optical signal optical signal propagating within such a buried waveguide. Numerous other embodiments of the invention may be envisioned by a person of skill in the art of waveguide design without departing from the spirit or scope of the invention.

What is claimed is:

1. An integrated waveguide structure comprising:
   a first waveguide for weakly confining a first optical signal propagating therein, said first waveguide having an optical propagation axis and a characteristic length as measured along said optical propagation axis, said first waveguide disposed on a substrate;

a first trench formed within said substrate on a first side of said first waveguide, said trench having a characteristic length as measured parallel to said optical propagation axis of the first waveguide, said characteristic length of the trench being substantially shorter than said characteristic length of the first waveguide;

a second trench formed on a second side of the first waveguide, said second trench disposed opposite said first trench, said second trench having a characteristic length approximately equal to that of the first trench;

a third trench formed within said substrate on a first side of said first waveguide, said third trench having a characteristic length as measured parallel to said optical propagation axis of the first waveguide, said characteristic length of the third trench being substantially shorter than said characteristic length of the first waveguide; and, a fourth trench formed on a second side of the first waveguide, said fourth trench disposed opposite said third trench, said fourth trench having a characteristic length approximately equal to that of the third trench, said trenches having a low index of refraction material therein, said characteristic length of the first trench, said characteristic length of the third trench, and a distance between the first trench and the second trench being chosen to provide a predetermined polarization characteristic to the waveguide structure.

2. An integrated waveguide structure according to claim 1, wherein the predetermined polarization characteristic of the waveguide structure is chosen such that the polarization characteristic of an optical signal is substantially unchanged as the optical signal propagates along the first waveguide.

3. An integrated waveguide structure according to claim 1, wherein the substrate is a semi-conductor material.

4. An integrated waveguide structure according to claim 3, wherein the semi-conductor material is Indium Phosphide.

5. An integrated waveguide structure according to claim 3, wherein the semi-conductor material is Gallium Arsenide.

6. An integrated waveguide structure according to claim 1, wherein the trench is formed in a deep etching process.

7. An integrated waveguide structure according to claim 1, wherein the waveguide structure is a buried waveguide structure.

8. An integrated waveguide structure according to claim 1, wherein the waveguide structure is a ridge waveguide structure.

9. An integrated waveguide structure according to claim 1, wherein the first trench and the third trench are co-linear.

10. An integrated waveguide structure according to claim 9, wherein the first trench and the third trench are parallel to the first waveguide.

11. An integrated waveguide structure according to claim 10, wherein the first trench and the third trench are co-linear.

12. An integrated waveguide structure according to claim 1, comprising an optical component having an other than zero polarization characteristic, said optical component in optical communication with the waveguide structure, the polarization characteristic of the waveguide substrate chosen such that the overall polarization experienced by an optical signal propagating through both devices along an optical path is zero.

13. An integrated waveguide structure according to claim 12, wherein the optical component is a semiconductor optical amplifier.

14. An integrated waveguide structure according to claim 12, wherein the optical component is an erbium doped waveguide array.

15. An integrated waveguide structure according to claim 12, wherein the integrated waveguide structure and the optical component are provided on a same integrated substrate.

16. An integrated waveguide structure according to claim 15, wherein the optical component is a semiconductor optical amplifier.

17. An integrated waveguide structure according to claim 15, wherein the optical component is an erbium doped waveguide array.

18. A method of providing a polarization characteristic to an optical signal comprising:
propagating the optical signal along a first section of a waveguide having a first set of trenches disposed sufficiently proximate the waveguide, the trenches for dispersing an optical signal coupled from the waveguide to any of the first set of trenches;

propagating the optical signal along a second section of the waveguide absent trenches; and, propagating the optical signal along a third section of a waveguide having a second set of trenches disposed sufficiently proximate the waveguide, the second set of trenches for dispersing an optical signal coupled from the waveguide to any of the second set of trenches, such that the first section, the second section and the third section each has a predetermined polarization characteristic per unit length and the lengths of the first section, second section and third section are chose to provide a predetermined polarization characteristic to the optical signal.

19. A method of providing a polarization characteristic to an optical signal according to claim 18, comprising:
propagating an optical signal through an optical component having a predetermined non-zero polarization characteristic such that the overall polarization characteristic provided to the optical signal is zero.

* * * * *